(12) United States Patent
Atsushi Kotsubo

(10) Patent No.: US 11,192,749 B2
(45) Date of Patent: Dec. 7, 2021

(54) OPERATING PANEL FOR AN ELEVATOR PROVIDING OPTIONS OF INDICATING ADDITIONAL FLOOR INFORMATION

(71) Applicant: Inventio AG, Hergiswil (CH)

(72) Inventor: Carlos Atsushi Kotsubo, Sao Paulo (BR)

(73) Assignee: INVENTIO AG, Hergiswil NW (CH)

( * ) Notice: Subject to any disclaimer, the term of this patent is extended or adjusted under 35 U.S.C. 154(b) by 511 days.

(21) Appl. No.: 15/742,585

(22) PCT Filed: Jul. 7, 2016

(86) PCT No.: PCT/EP2016/066058
§ 371 (c)(1),
(2) Date: Jan. 8, 2018

(87) PCT Pub. No.: WO2017/005828
PCT Pub. Date: Jan. 12, 2017

(65) Prior Publication Data
US 2018/0201475 A1    Jul. 19, 2018

(30) Foreign Application Priority Data

Jul. 8, 2015 (EP) .................................. 15175818

(51) Int. Cl.
*B66B 1/46* (2006.01)
*B66B 3/00* (2006.01)
*G06F 3/044* (2006.01)

(52) U.S. Cl.
CPC .............. *B66B 1/468* (2013.01); *B66B 3/002* (2013.01); *B66B 3/008* (2013.01); *B66B 2201/4623* (2013.01); *G06F 3/044* (2013.01)

(58) Field of Classification Search
CPC ......... B66B 1/468; B66B 3/002; B66B 3/008; B66B 1/463; B66B 1/46; B66B 2201/463
(Continued)

(56) References Cited

U.S. PATENT DOCUMENTS

| 6,550,587 B1 * | 4/2003 | Yuasa ..................... B66B 1/462 187/394 |
| 10,303,744 B2 * | 5/2019 | Muncy .................. G06F 40/106 |

(Continued)

FOREIGN PATENT DOCUMENTS

| CN | 103974888 A | 8/2014 |
| EP | 1870367 A1 | 12/2007 |

(Continued)

*Primary Examiner* — Marlon T Fletcher
(74) *Attorney, Agent, or Firm* — William J. Clemens; Shumaker, Loop & Kendrick, LLP

(57) ABSTRACT

An elevator operation panel has a plurality of buttons for selecting target floors and a plurality of touch-sensitive areas, each area being associated with one of the buttons. The panel includes an output device, such as a display or a loudspeaker, for outputting information, a control unit connected to the buttons, to the areas and to the output device, and a data storage device storing at least one data folder for each target floor. Each folder contains information relating to the associated target floor. Upon triggering one of the touch-sensitive areas, the control unit reads the information in one of the folders relating to the target floor selectable by the button to which the area is associated and outputs the information at the output device. Subsequent triggering of the same area causes the control unit to read another folder related to the target floor and output the information therein.

13 Claims, 1 Drawing Sheet

(58) Field of Classification Search
USPC .......................................................... 187/389
See application file for complete search history.

(56) References Cited

U.S. PATENT DOCUMENTS

| | | | |
|---|---|---|---|
| 2005/0019226 A1 | 1/2005 | Boden et al. | |
| 2007/0158140 A1* | 7/2007 | Takeuchi | B66B 3/00 187/391 |
| 2008/0006487 A1* | 1/2008 | Amo | G09F 21/04 187/396 |
| 2010/0044161 A1* | 2/2010 | DiFranza | B66B 3/00 187/396 |
| 2012/0206362 A1* | 8/2012 | Gazdzinski | G06F 3/14 345/168 |
| 2014/0312884 A1* | 10/2014 | Reilio | G01P 3/42 324/207.11 |
| 2015/0019226 A1 | 1/2015 | Gazdzinski | |
| 2015/0052446 A1* | 2/2015 | Gazdzinski | G06F 3/041 715/739 |
| 2016/0174334 A1* | 6/2016 | Anthony | B66B 11/0233 315/153 |
| 2017/0073185 A1* | 3/2017 | Haipus | B33Y 80/00 |
| 2017/0109132 A1* | 4/2017 | Gazdzinski | G06F 3/0482 |
| 2017/0129739 A1* | 5/2017 | Simcik | B66B 1/468 |
| 2017/0305716 A1* | 10/2017 | Peterson | B66B 1/468 |
| 2017/0341903 A1* | 11/2017 | Adkins | B66B 1/463 |
| 2017/0355556 A1* | 12/2017 | Simcik | B66B 1/468 |
| 2018/0101873 A1* | 4/2018 | Cai | G09G 5/003 |
| 2018/0201475 A1* | 7/2018 | Atsushi Kotsubo | B66B 1/468 |
| 2018/0273345 A1* | 9/2018 | Rao | B66B 5/021 |
| 2018/0307655 A1* | 10/2018 | Muncy | G06F 3/0488 |
| 2019/0241398 A1* | 8/2019 | Marvin | B66B 1/28 |
| 2019/0292011 A1* | 9/2019 | Makela | B66B 1/52 |
| 2020/0062541 A1* | 2/2020 | Vuorenala | B66B 3/008 |

FOREIGN PATENT DOCUMENTS

| | | |
|---|---|---|
| WO | 2007116465 A1 | 10/2007 |
| WO | 2007116565 A1 | 10/2007 |

* cited by examiner

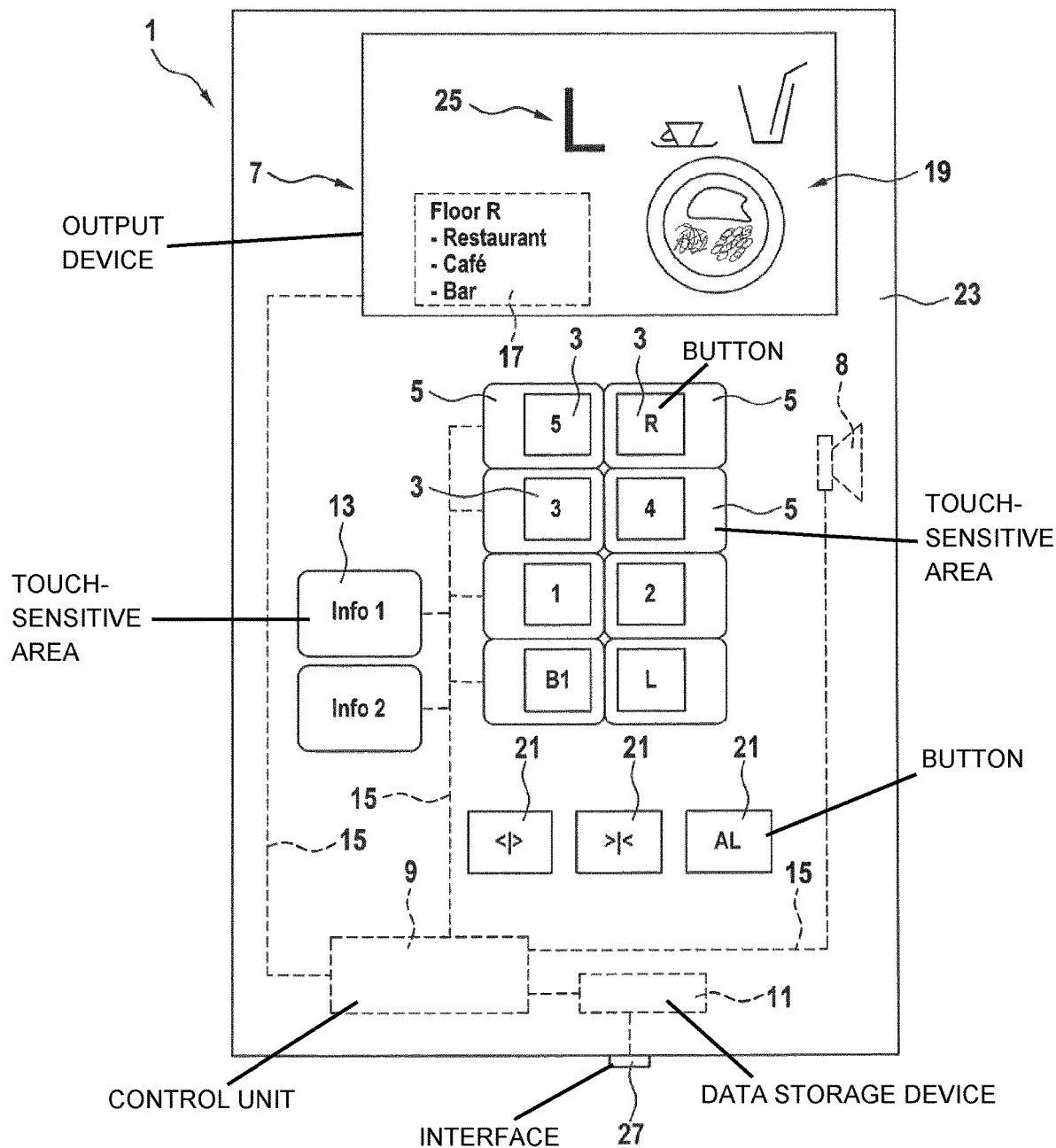

OPERATING PANEL FOR AN ELEVATOR PROVIDING OPTIONS OF INDICATING ADDITIONAL FLOOR INFORMATION

FIELD

The present invention relates to an operating panel for an elevator.

BACKGROUND

Elevators generally serve as transportation means for transporting persons or goods between various levels or floors e.g. in a building. Operating panels may be used by a user of the elevator, inter alia, for indicating to an elevator control to which level an elevator car shall travel.

For example, a car operating panel (COP) is generally mounted within the car of the elevator. Conventionally, the COP comprises multiple buttons for selecting one of a plurality of floors. By pressing or touching one of the buttons, the user may indicate to which floor or level the car shall be transferred.

The COP may include information means for indicating e.g. which floors have already been selected as travel targets. For example, a button which has been activated by a user may subsequently be illuminated and/or change its color. Furthermore, the COP may include a display on which an information concerning e.g. a current position of the elevator car may be indicated.

Operation panels have been proposed which allow indicating of additional information to a user of the elevator, such additional information comprising e.g. details of facilities provided at a floor. For example, EP 1 870 376 A1 describes a destination floor registration device enabling access to further floor information.

There may be a need for an alternative operation panel for an elevator which enables, inter alia, simple and intuitive release of information relating to a target floor. There may also be a need for an elevator comprising such operation panel.

SUMMARY

According to an aspect of the present invention, an operating panel for an elevator is proposed, the operation panel comprising a plurality of buttons, a plurality of touch-sensitive areas, an output device, a control unit and a data storage device. Each of the plurality of buttons may serve for selecting one of a plurality of target floors. Each of the plurality of touch-sensitive areas is associated to one of the buttons. The output device is adapted for outputting information and may be e.g. a display, a loudspeaker, etc. The control unit is connected to each of the buttons and to each of the touch-sensitive areas and to the output device. The data storage device comprises at least one data folder, or preferably a plurality of data folders, stored therein, wherein each data folder comprises information relating to one of the target floors. Therein, the control unit is adapted to, upon triggering one of the touch-sensitive areas, reading one of the plurality of data folders comprising information relating to the target floor selectable by the button to which the touch-sensitive area is associated and outputting this information via the outputting device. Furthermore, the control unit is adapted to, upon triggering once more the one of the touch-sensitive areas, reading another data folder comprising another information relating to the target floor selectable by the button to which the touch-sensitive area is associated and outputting this further information via the outputting device. The other data folder may be one of the plurality of data folders stored in the data storage device.

Ideas underlying embodiments of the present invention may be interpreted as being based, inter alia, on the following observations and recognitions.

The operation panel described herein may provide for indicating or releasing additional information to a user of an elevator in a particularly intuitive manner. Specifically, additional information about e.g. facilities, features, services, room, persons, etc. to be accessed at specific floors of a building may be stored in various data folders on a data storage device. Additional to conventional buttons for selecting a floor to which a user wants to be transferred, the operation panel comprises touch-sensitive areas. These touch-sensitive areas are connected to a control unit. Upon activating of a touch-sensitive area by a user touching this touch-sensitive area, a signal may be transmitted to the control unit. When receiving such signal, the control unit is triggered to read one of the data folders stored in the data storage device, this data folder comprising information relating to the floor to which the touch-sensitive area and its associated button refers. This information may then be output using the output device thereby providing the information to the user of the elevator. If this user wants to obtain further or other information, the user may touch once more the touch-sensitive area thereby triggering the control unit once more. Upon such repeated triggering, the control unit reads another data folder comprising information relating to the same floor and outputs this information using the output device.

In such way, the user may very easily and intuitively access various additional pieces of information relating to one of the target floors. In case the user then decides, maybe based on the information presented by the output device, to travel to this floor, the user may easily press the button associated to the touch-sensitive area in order to thereby select the floor as a next travel target of the elevator car.

Thus, according to an embodiment of the invention, for at least some of the target floors, various information is stored in a plurality of data folders on the data storage device. Therein, the control unit is adapted to, reacting to each one of a sequence of triggerings of one of the touch-sensitive areas, sequentially reading a predetermined correlated one of the plurality of the data folders comprising information relating to the target floor selectable by the button to which the touch-sensitive area is associated and outputting the information via the outputting device.

In other words, when a user touches one of the touch-sensitive areas several times in a sequence, the control unit is triggered each time and acquires another piece of information each time by reading another one of the data folders and finally outputs the respective piece of information to the user. Thereby, the user may intuitively "click through" a set of information in order to search for information he requires.

According to an embodiment of the invention, each of the touch-sensitive areas is arranged in a direct neighborhood to the associated one of the buttons. Therein, a "direct neighborhood" may mean that a surface of the touch-sensitive area directly abuts to a surface of the associated button or is arranged at a relatively small distance of e.g. less than 1 cm to the associated button. Preferably, the touch-sensitive area completely encloses the associated button.

Due to such direct neighborhood, it is intuitive to a user that touching this touch-sensitive area triggers providing information about the floor which may be selected by pressing the button, for example a number of the floor being indicated on the button.

According to an embodiment of the invention, the operating panel further comprises a time indicator such as a clock and/or calendar for indicating a current time and information stored in data folders and relating to one of the target floors is time-dependent. Then, the control unit may be adapted to, upon triggering one of the touch-sensitive areas, reading one of the plurality of data folders comprising information relating to the target floor selectable by the button to which the touch-sensitive area is associated and correlating to a time indicated by the time indicator and outputting the information via the outputting device.

In other words, the control unit determines which information is to be read and output not only based upon which floor this information shall relate to but also takes into account the current time when determining the information to be read and thus outputs e.g. only information which is currently of interest for the user.

For example, if the information to be output relates to a restaurant established at a selectable target floor, at a current time being e.g. 6 pm only a dinner menu is output but not a lunch menu.

According to an embodiment of the invention, the output device is a display and the information is at least one of textual and graphical and is displayed on the display. For example, information may be visually displayed on the display as text, icons and/or images. Such visual displaying may be intuitive to a user. For example, even persons such as children who may not be able to read a text or such as foreigners who do not understand a local language may understand an information provided in a form of icons or images.

According to an embodiment of the invention, the output device is a loudspeaker and the information is audible and is output via the loudspeaker. Thereby, information may be output to e.g. blind people. Furthermore, audible information may support other ways of information provision. For example, an image of a restaurant or shop situated at a selectable floor may be supported by playing e.g. an audible advertising slogan.

According to an embodiment of the invention, the data storage device comprises non-volatile memory. Such storage device may enable long-term storing of information, even in case of power failure. Furthermore, some non-volatile storage means such as flash memory may enable very fast reading of stored information.

According to an embodiment of the invention, the buttons are push buttons. Such push buttons are frequently used in elevator operating panels for selecting target floors and are therefore common to elevator users. Furthermore, push buttons may enable a favorable haptics upon activating the button.

According to an embodiment of the invention, the touch-sensitive areas are established using capacitive-sensitive devices. Touch-sensitive areas may be easily established using capacitive-sensitive devices which measure or detect an electrical capacity at a surface of the device and which, upon occurrence of a significant change of such capacitance due to e.g. a user touching the surface of the device, provide a signal indicating that the touch-sensitive area has been triggered.

Particularly the combination of a push button for selecting a target floor and an associated, preferably directly neighboring touch-sensitive area for triggering information output relating to this target floor may provide for very easy and intuitive information access for a user of an elevator.

According to an embodiment of the invention, the operating panel further comprises an interface for remotely accessing the data storage device and storing information therein.

In other words, a memory serving as a data storage device may be accessed remotely via the interface thereby enabling storing data in the memory from a position or device being remote to the operation panel. For example, data or information may be prepared or edited remotely in a computer and may then be transmitted to the operation panel and may, via the interface of the operation panel, be stored in the data storage device of the operation panel.

According to an embodiment of the invention, the operating panel further comprises at least one additional touch-sensitive area not being associated to one of the buttons and a data storage device comprising at least one additional data folder stored therein. Therein, each additional data folder comprises information not relating to a specific one of the target floors. Furthermore, the control unit is adapted to, upon triggering one of the additional touch-sensitive areas, reading one of the additional data folders and outputting the information via the outputting device.

In other words, additional to the touch-sensitive areas associated to the buttons for target floor selection, one or more additional touch-sensitive areas are provided at the operation panel via which a user may trigger indicating of information which does not necessarily relate to one of the floors but which may be e.g. general information about the building, services in the building, personal of the building, etc.

According to an embodiment of the invention, the control unit is hard-wired to each of the buttons, to each of the touch-sensitive areas and to the output device. Such hard-wiring may generally provide for a reliable data transmission. Due to generally short distances between the buttons, the touch-sensitive areas and the output device, hard-wiring does not necessarily require substantive financial or work efforts. For example, all these components may be provided on a common printed circuit board (PCB). However, as an alternative to hard-wiring, signal transmission to or from the control unit may also be established using other types of connections such as e.g. wireless signal transmission.

It shall be noted that possible features and advantages of embodiments of the invention are described herein partly with respect to an operation panel and partly with respect to an elevator comprising such operation panel. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawing. However, neither the drawing nor the description shall be interpreted as limiting the invention.

DESCRIPTION OF THE DRAWINGS

FIG. 1 shows an operation panel according to an embodiment of the present invention.

The FIGURE is only schematic and not to scale.

DETAILED DESCRIPTION

FIG. 1 shows an operating panel 1 which may serve as a car operating panel in a car of an elevator according to an embodiment of the present invention.

The operation panel 1 comprises a plurality of buttons 3 for selecting one of a plurality of target floors in a building to which the elevator car may be transferred. The operation panel further comprises a plurality of touch-sensitive areas 5, an output device 7 for outputting information, a data storage device 11 and a control unit 9 being connected to each of the buttons 3, to each of the touch-sensitive areas 5 and to the output device 7.

All these components of the operation panel 1 may be included or embedded in or covered by a cover sheet 23 such as a planar metal sheet such that the buttons 3 and the touch-sensitive areas 5 may be pressed or touched by a user from a front side of the operation panel 1 and information output by the output device 7 may be perceived by such user.

The buttons 3 may be push buttons which may be pressed for activation and which, upon such activation, output or enable outputting an activation signal to be transmitted to the control unit 9. One button 3 may be provided for each floor in a building to which a car of the elevator may travel. By activating a button, a user may indicate his request to travel with the elevator car to the selected floor. A corresponding signal may be transferred to an elevator control unit which may then control an elevator drive unit to displace the car to the requested floor. A number or identification of the selectable floor may be indicated on or close to each of the buttons 3.

Each of the touch-sensitive areas 5 is associated to one of the buttons 3. For example, a touch-sensitive area 5 is arranged in a direct neighborhood of its associated button 3, i.e. for example with a distance to the associated button 3 being significantly smaller than a distance to any other button 3. For example, the distance may be smaller than 2 cm, preferably smaller than 1 cm or 0.5 cm. In the example shown, each of the touch-sensitive areas 5 surrounds, i.e. encloses, its associated button 3.

The touch-sensitive areas 5 may be established e.g. with capacitive-sensitive devices. Such capacitive-sensitive devices may sense a capacity change occurring due to e.g. a user's finger touching the touch-sensitive area 5. A surface of a touch-sensitive area 5 may be static, i.e. non-depressable. Such surface may be integral with the cover sheet 23 of the operation panel. Alternatively, a touch-sensitive area 5 may have its own partial cover sheet being integrated the overall cover sheet 23. An outer contour of a touch-sensitive area 5 may be indicated visually.

Upon touching one of the touch-sensitive areas 5, a signal is transmitted from the touch-sensitive area 5 via a hardwiring 15 to the control unit 9. Upon such triggering, the control unit 9 determines to which button 3 the touched touch-sensitive area 5 is associated to. Based on this knowledge, the control unit 9 may access the data storage device 11 and may read one of a plurality of data folder stored therein, this data folder comprising information relating to the floor which may be selected with the button 3 to which the touched touch-sensitive area 5 is associated. Such information may then be output using the output device 7.

For example, a user enters the elevator car and wants to obtain more information about facilities provided at a roof floor. The user then touches the touch-sensitive area 5 surrounding the button 3 having the indication "R" thereon. Upon such touching, the control unit 9 is triggered to search in the data storage device 11 for a data folder comprising information about any facilities provided at the roof floor. For example, there is a first data folder providing the information that a restaurant is situated at the roof floor, this restaurant also providing goods and services of a café and a bar. This information may be output via the output device 7.

For example, in case the output device 7 is a display or screen, this information may be output as written text information 17. Alternatively or additionally, such information or parts of such information or additions to such information may be output as visible icons 19. Preferably, such information is output at locations of the display aside to e.g. a central area 25 at which a current position of the elevator car is indicated.

Additional or alternatively to outputting information in a visual manner, information may be output in other manners such as in an audible manner. For example, the information may be spoken by a voice or may be in the form of typical sounds or noises. For this purpose, the operation panel 1 may comprise e.g. a loudspeaker 8 serving as an output device.

In case, a user wants to obtain further or more detailed information, he may touch the touch-sensitive area 5 repeatedly. Upon each touching, the control unit 9 is triggered to sequentially read another one of the data folders stored in the data storage device 11 and including information about the addressed target floor.

For example, after having indicated that a restaurant is located at the roof floor, upon touching the respective touch-sensitive area 5 once more, e.g. opening hours of such restaurant may be displayed. Then, upon touching the touch-sensitive area 5 again, e.g. a menu is displayed. Then, upon touching the touch-sensitive area 5 once again, e.g. accepted means of payment such as credit cards are displayed, and so on. A sequence in which the information is displayed may be predetermined, for example by the sequence in which the respective data folders comprising the information are stored on the data storage device.

Each touching of a touch-sensitive area 5 may change a content and/or type of output information, such as background image, text information and/or voice. For example, upon first touching the R floor touch-sensitive area 5, a floor information image is displayed on the display output device 7 and floor information is announced via the loudspeaker output device 8. Upon a next touching, a text information 17 is output. Then, upon subsequent touching, a "dinner of the day" icon 19 is visualized.

Furthermore, the operation panel 1 may comprise a time indicator such as a clock and/or a calendar. The time indicator may indicate a current time of the day and/or a day in the week, month or year. Such time indicator may be e.g. incorporated into the control unit 9. By comparing a current time indicated by such time indicator with information pieces comprised in the data folders, the control unit 9 may determine whether information comprised in one of the data folders relating to a selected floor is currently relevant and shall be output, or not.

For example, information relating to the restaurant situated at the roof floor may comprise a lunch menu and other information may comprise a dinner menu. Based on knowledge about the current time the control unit 9 may decide which of the menus is currently of interest for a user and may then output the respective information.

The information to be output may be managed in a basic structure of a folder structure that stores the information in a form of images, text, sound, voice files, etc. The data folders are stored in the data storage device 11 which comprises preferably non-volatile memory locally in the elevator car such that any stored information may be retrieved quickly and e.g. updated in the display immediately.

For realizing high flexibility in a configuration of the operation panel 1, a whole structure of data folders and information comprised therein may be edited preferably offline, i.e. at a remote device such as a remote computer. The data structure may then be transferred to the operation panel 1 via an interface 27 in order to store it in the data storage device 11. The interface 27 may be hard-wired or wire-less.

The operation panel 1 additionally comprises additional touch-sensitive areas 13 which are not associated to one of the buttons 3. These additional touch-sensitive areas 13 are arranged at locations significantly spaced apart from the buttons 3. Upon touching one of such additional touch-sensitive areas 13 the control unit 9 acquires information stored in at least one additional data folder. Such information may not specifically relate to one of the floors of a building but may be general information, e.g. information concerning the building as a whole. For example, such information may comprise building local news, news on a condominium meeting, special day messages (e.g. concerning mother day, valentine day, etc.), new condominium rules and/or other messages of tenant interest.

The operation panel 1 may comprise further buttons 21 which are not provided for selecting a target floor but for initiating other elevator functions such as door opening, door closing or outputting an alarm.

Summarizing, the operation panel 1 described herein may provide for easy and intuitive information release to a user of an elevator.

Finally, it should be noted that terms such as "comprising", "including", etc. do not exclude other elements or steps and terms such as "a" or "an" do not exclude a plurality. Also elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1 operation panel
3 buttons
5 touch-sensitive areas
7 output device (display/screen)
8 output device (loudspeaker)
9 control unit
11 data storage device
13 additional touch-sensitive areas
15 hard-wiring
17 text information
19 icon
21 further buttons
23 cover sheet
25 central area of display
27 interface

The invention claimed is:
1. An operating panel serving as a car operating panel in an elevator car comprising:
a cover sheet;
a plurality of push buttons included in the cover sheet, each of the push buttons for selecting one of a plurality of target floors;
a plurality of touch-sensitive areas included in the cover sheet, each of the touch-sensitive areas being associated to one of the push buttons;
an output device for outputting information;
a control unit connected to each of the push buttons, to each of the touch-sensitive areas and to the output device;
a data storage device storing at least one data folder therein for an associated one of the target floors, wherein each of the data folders includes information relating to the associated target floor;
wherein the control unit, in response to triggering of one of the touch-sensitive areas, reads the information from the one of the data folders associated with the target floor selected by pressing the push button with which the triggered touch-sensitive area is associated and outputs the information via the output device; and
wherein the control unit, in response to a subsequent triggering of the one of the touch-sensitive areas, reads another one of the data folders including other information relating to the associated target floor and outputs the other information via the output device.

2. The operating panel according to claim 1 wherein, for at least one of the target floors, various information is stored in a plurality of the data folders in the data storage device, and wherein the control unit responds to each one of a sequence of triggerings of one of the touch-sensitive areas associated with the at least one of the target floors by sequentially reading the information from the plurality of data folders and outputting the information via the output device.

3. The operating panel according to claim 1 wherein each of the touch-sensitive areas is arranged in a direct neighborhood to the associated one of the push buttons.

4. The operating panel according to claim 1 including a time indicator for indicating a current time, wherein information stored in the data folders and relating to one of the target floors is time-dependent, wherein the control unit, upon triggering of one of the touch-sensitive areas, reads from one of the data folders the time-dependent information and correlates to a time indicated by the time indicator and outputs the time-dependent information via the output device.

5. The operating panel according to claim 1 wherein the output device is a display and wherein the information is at least one of textual form and graphical form and is displayed on the display.

6. The operating panel according to claim 1 wherein the output device is a loudspeaker and wherein the information is audible and is output via the loudspeaker.

7. The operating panel according to claim 1 wherein the data storage device includes a non-volatile memory for storing the data folders.

8. The operating panel according to claim 1 wherein the touch-sensitive areas are formed by capacitive-sensitive devices.

9. The operating panel according to claim 1 including an interface for remotely accessing the data storage device and storing the information therein.

10. The operating panel according to claim 1 including at least one additional touch-sensitive area not being associated with one of the push buttons, wherein the data storage device has at least one additional data folder stored therein, wherein the at least one additional data folder includes additional information not relating to a specific one of the target floors, wherein the control unit in response to triggering of the at least one additional touch-sensitive area reads the additional information from the at least one additional data folder and outputs the additional information via the output device.

11. The operating panel according to claim 1 wherein the control unit is hard-wired to each of the push buttons, to each of the touch-sensitive areas and to the output device.

12. An elevator comprising an operating panel according to claim 1 adapted to serve as a car operating panel in an elevator car.

13. The operating panel according to claim 1 wherein each of the push buttons is surrounded by the associated one of the touch-sensitive areas.

* * * * *